E. M. KELLOGG.
GRAIN SHOCKER.
APPLICATION FILED JAN. 31, 1910.

1,170,823.

Patented Feb. 8, 1916.
5 SHEETS—SHEET 5.

UNITED STATES PATENT OFFICE.

EDWIN M. KELLOGG, OF MOLINE, ILLINOIS.

GRAIN-SHOCKER.

1,170,823.  Specification of Letters Patent.  Patented Feb. 8, 1916.

Application filed January 31, 1910. Serial No. 541,004.

*To all whom it may concern:*

Be it known that I, EDWIN M. KELLOGG, a citizen of the United States, residing in Moline, in the county of Rock Island and State of Illinois, have invented certain new and useful Improvements in Grain-Shockers, of which the following is a specification.

This invention relates to that class of grain shockers which are adapted to be attached to a grain harvesting machine such as a self binder, receive the cut grain from the harvester binder in the form of bundles, automatically deposit the bundles in a suitable shock receptacle forming part of the shocker, with butts rearward to form a shock, and deposit the shock in upright position upon the ground automatically and during the movement of the shocker and harvesting machine.

The principal object of the invention is to provide a simple, economical and efficient shock binder and shocker for harvesting machines.

A further object of the invention is to provide a shock binder and shocker adapted to be attached to and operated by a harvesting machine, such as a self binder, so as to receive the bundles from the harvester binder with the butts of the stalks forward, deposit the bundles in a shock receptacle butt ends rearward between the binder arm or needle and the knotter mechanism of the shocker, guide the twine for binding the shock into the desired position, bind the bundles into a shock while in the shock receptacle, and automatically deposit the bound shocks upon the ground in upright position with butts slightly spread and the shock so formed, bound and dumped as to remain standing.

A further object of the invention is to provide a shocker having a shock receptacle or dumping bottom adapted to receive the bundles for forming a shock, a bundle lifting cradle, basket or arm adapted to receive the bundles from a harvester binder and deposit them successively in the shock receptacle by turning the bundles in a circular path in a vertical plane from a position in which the butts of the stalks are forward to a position in which the butts are rearward, shock binding mechanism comprising a binder arm or needle located on one side of the shock receptacle and knotter mechanism on the opposite side of the shock receptacle, and connecting mechanism extending transversely of the shocker and operatively connecting the binder arm or needle and the knotter mechanism or knotter cam shaft of the shocker, the bundle lifting cradle or arm having a projecting portion or twine-engaging finger adapted to engage the twine for binding the shock, in advance of the first bundle of each shock and guide the twine to the proper position across the shock receptacle or with respect to the bundles to be bound into a shock, said bundle lifting cradle or arm being adapted to receive the bundles successively from the harvester binder and move with and carry the bundles successively over the mechanism which connects the binder arm or needle and the knotter mechanism or knotter cam shaft of the shock binder and deposit the bundles in the shock receptacle in position to be bound and set up in the form of a shock.

Other and further objects of the invention will appear from an examination of the drawings and the following description and claims.

The invention consists in the features, combinations, and details of construction herein described and claimed.

In the accompanying drawings Fig. 6, a plan view of the parts shown in Fig. 5; Fig. 7, a detail view of the ratchet dog, and trip stop mechanism for the shaft which operates the bundle lifting cradle to lift and deposit the bundles successively in the shock receptacle, and Fig. 8, a similar view in detail of the ratchet, dog and trip-stop mechanism for the shaft which actuates the dumping bottom or shock receptacle.

The ratchet, dog, and trip stop mechanism for connecting, controlling or releasing the mechanism for actuating the shock binding mechanism and the tail piece of the shock receptacle, respectively is shown in Figs. 5 and 6.

In constructing a grain shocker in accordance with my improvements and connected with or adapted to be operatively connected with and operated with and by means of a harvesting machine, I provide a harvester which may be of any ordinary well known or desired form, and which is here shown as comprising a machine frame 1 mounted upon a traction wheel 2, and having a shaft 3 operatively connected with the machine frame by means of sectors 4 and pinions 5 adapted to enable the machine frame to be raised and lowered as desired.

A counter-shaft 6 is mounted in the main frame of the harvester in suitable bearings 7 and 8, and is operatively connected with the main or traction wheel by means of a gear or sprocket wheel 9 which is in fixed relation to the traction wheel, a gear or sprocket wheel 10 mounted on and in fixed relation to the counter-shaft, and a sprocket chain 11 which operatively connects said gear or sprocket wheels.

All of the operating parts of the harvester, including the sickle shaft 12 and the mechanism for operating the harvester binder may be connected with the counter shaft in the usual way or connected and operated in any well known or desired manner.

The construction of a grain harvester being familiar to those skilled in the art to which this invention relates, it is not deemed necessary to describe or illustrate the same herein except so much thereof as is necessary to enable those skilled in the art to understand, make and use the invention.

The elevator frame 13, and the inclined binder deck 14 are supported by the main frame of the harvester, and the harvester is provided with the usual or any desired form of binder mechanism, which may comprise a knotter cam shaft 15 rotatably mounted in suitable bearings in the harvester frame, and having bundle discharging arms 16 fixed to the shaft and adapted to discharge the bound bundles from the harvester binder to the bundle lifting cradle or arm of the shocker. A knotter cam 17 is mounted upon the shaft 15, and the breast plate 18 of the harvester binder is mounted in the usual manner adjacent to the cam shaft and bundle discharging arms.

In order to provide means for operatively connecting the shocker mechanism with the harvester, or with the traction wheel of the harvester, and for transmitting the power from the harvester to the shocker, suitable shaft mechanism is provided which comprises shafts 19 and 20 connected by means of a universal joint 21 and each mounted in suitable bearings and operatively connected with the counter-shaft 6 of the harvester by means of a stub shaft 22, and a sprocket wheel 23 fixed to the shaft 22, a sprocket 24 upon and in fixed relation to the shaft 6, and a sprocket chain 25 in engagement with and forming a connection between said sprocket wheels or gears. Any desired form of gear mechanism may be employed however, for connecting the shafts 6 and 20, and a universal joint 26 forms the connection between the stub shaft 22 and the shaft 19.

Figure 2:
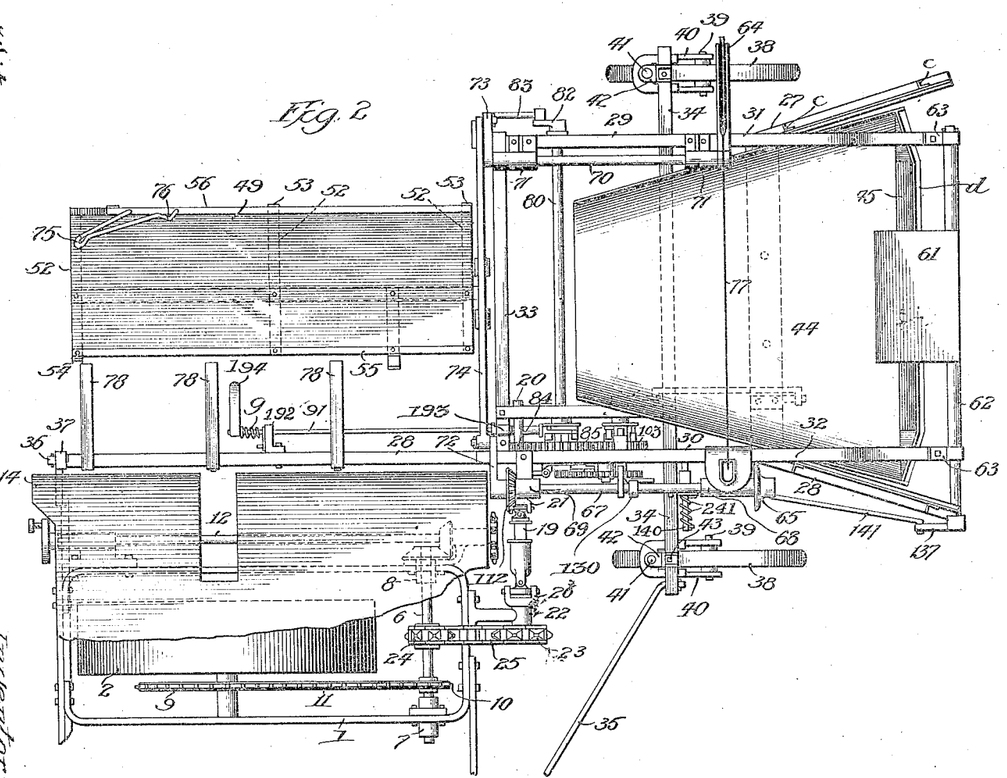
Fig. 2, is a plan view of the same.

The grain shocker is provided with a main frame which is constructed preferably as follows: Bottom side frame members 27 and 28 are so constructed and arranged that their forward portions are substantially parallel and their rear portions diverge rearward as shown in Fig. 2. Upper side frame members 29 and 30 of angular form extend above the parallel portions of said bottom side frame members. Upright frame members 31 and 32 extend above the diverging portions or rearward from the parallel portions of the bottom side frame members 27 and 28 respectively, and the side frames thus formed are provided with side boards *a* and *b* and strengthening ribs *c* so as to form rigid closed sides for the shock receptacle. Transverse frame members 33 and 34, which, like the entire frame of the shocker are made preferably of angle irons, but which may differ from the other metallic or angle iron portions of the shocker frame, are arranged at suitable intervals across the shocker in position to connect the frame members 27 and 28, and are here shown constructed of square pipe or tubing. The member 34 is adapted to form a transverse bolster, sill or axle, which connects the side frames and supports the shocker frame and serves as one of the elements for connecting the supporting wheels with the frame. The end of the transverse sill or bolster 34 which is toward the harvester is connected with the harvester frame by means of a brace 35 which is loosely connected at its opposite ends with said shocker frame member or bolster and the frame of the harvester respectively, so as to permit the desired vertical play and hold the shocker parallel with the line of travel of the harvester.

The bottom side-frame member 28 of the shocker, which is on the side adjacent to the harvester extends forward of the shock receptacle alongside of the harvester frame to the forward end of the latter and is provided with a rounded journal or bearing portion 36 which is pivotally or rotatably mounted in a suitable bearing bracket or socket 37 on the harvester frame and forms a pivotal connection between the shocker frame and harvester frame, and, with the oblique brace 35 serves to hold the shocker in parallel relation to the harvester frame and permit the desired freedom of movement between the shocker and harvester to enable the machine to operate efficiently under varying conditions and while passing over uneven or irregular surfaces.

Supporting wheels 38 are mounted upon axles 39 which are supported between the ends of forks 40, and said forks are swiveled or pivotally connected with the transverse frame member or bolster 34 by means of upright pivots 41 on said forks and pivotally mounted in brackets 42 which are rigidly secured to the frame member or bolster 34 by means of bolts 43. The axial center of the pivots 41 being forward of the axles 39 of the supporting wheels provides the desired swivel connection between the wheels and the shocker frame whereby the shocker is adapted to be turned with facility and to permit the harvester to be turned as abruptly as circumstances may require.

The shocker side frames above described form the sides of a shock receptacle which is provided with a dumping bottom 44. This dumping bottom is provided with upwardly and outwardly curved side portions which diverge or become wider in the direction of the rear end of the shocker so as to permit the butts of the grain to project outward on all sides of the shock and hold the same in the desired position before and during the binding of the shock in the shock receptacle, in such a manner that the shock will be formed wider at the base than at the top, and will be symmetrical and stand up properly when deposited or dumped upon the ground. The dumping bottom is dished or concave on its upper side and is provided at its rear end with an up-standing flange 45 having an inwardly or forwardly projecting lip or flange $d$ adapted to engage the butts of the stalks or bundles which are at the bottom of the shock while in the shock receptacle and which form the forward portion of the shock when the latter is dumped. This flange and lip extend transversely beneath the forward edge of the shock during its movement toward the ground in the operation of dumping and is adapted to pull the butts of the stalks of the forward bundles of the shock forward sufficiently to cause said forward bundles to lean rearward and brace the shock so as to prevent it from falling forward or leaning forward.

The dumping bottom 44 is pivotally mounted in the frame of the shocker by means of a suitable pivot or hinges which may be of any desired form adapted to form a transverse pivot or fulcrum for the dumping bottom. In order to render the shocker as light as possible, in this respect, consistent with the strength required, the pintles or pivots 46 of the hinges are secured to a transverse sill or dumping-bottom supporting member 47, and are journaled in suitable brackets or hinge members 48 which are secured to the shocker frame.

Figure 1:
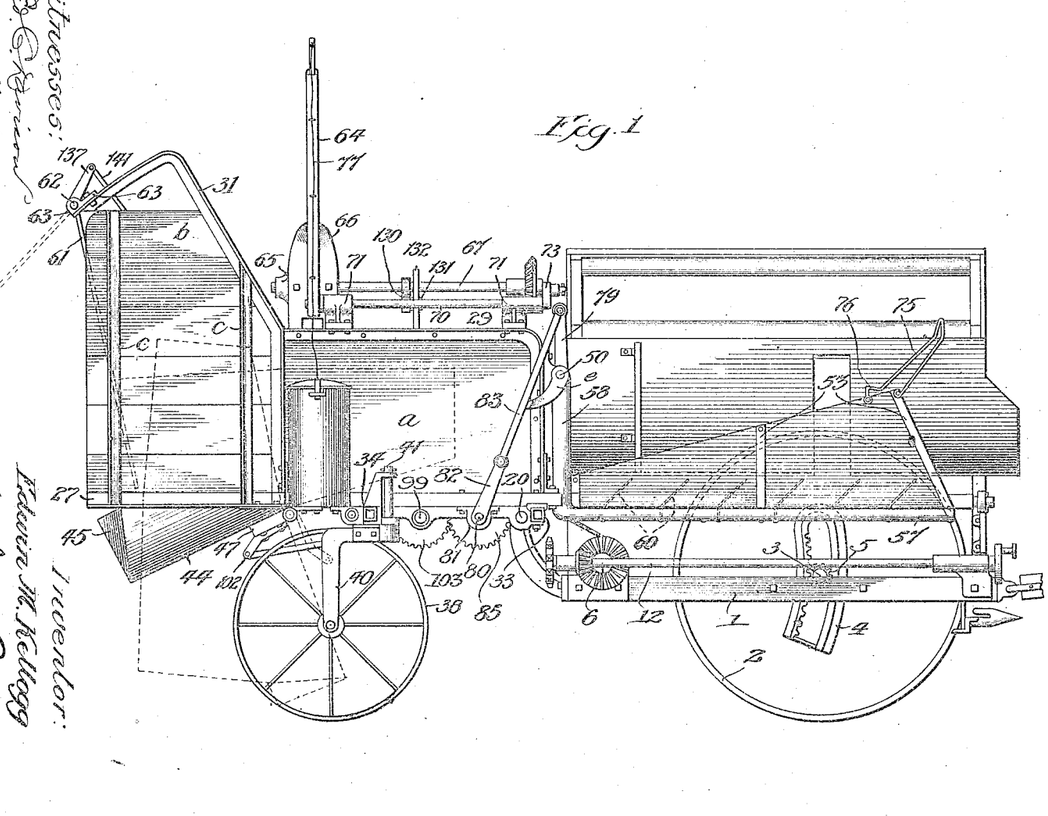
Figure 1 is a view in side elevation of a shocker constructed in accordance with my improvements, showing the same attached to a grain harvester or self-binder.
Figure 3:
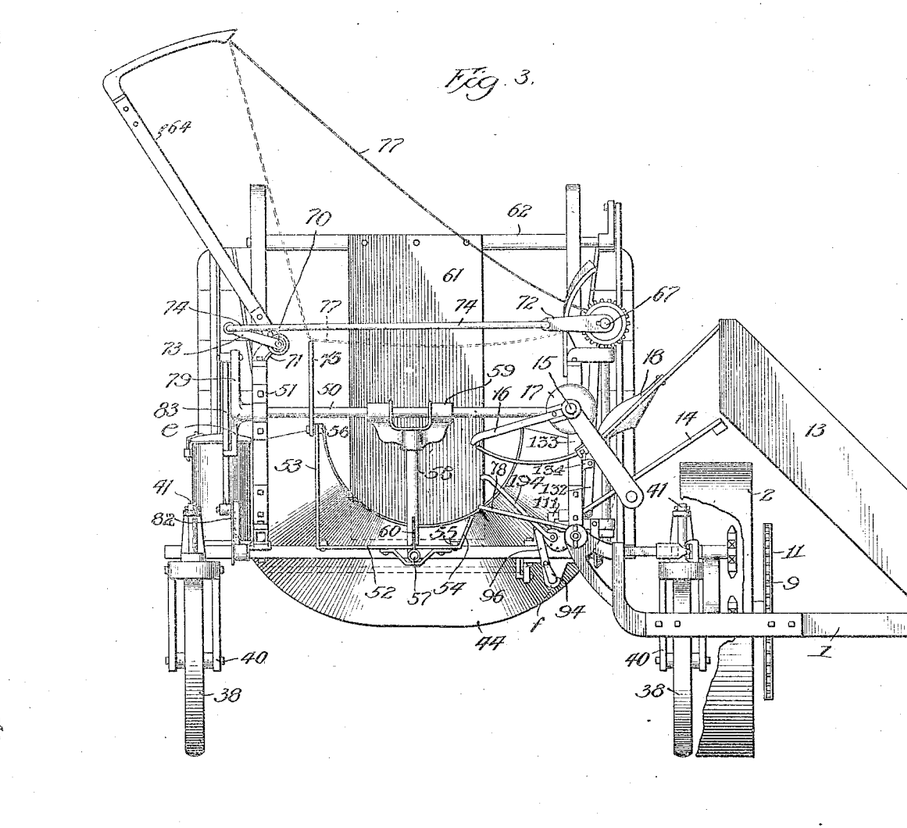
Fig. 3, a front view in elevation of the shocker and the harvester or self-binder shown in Figs. 1 and 2.
Figure 4:
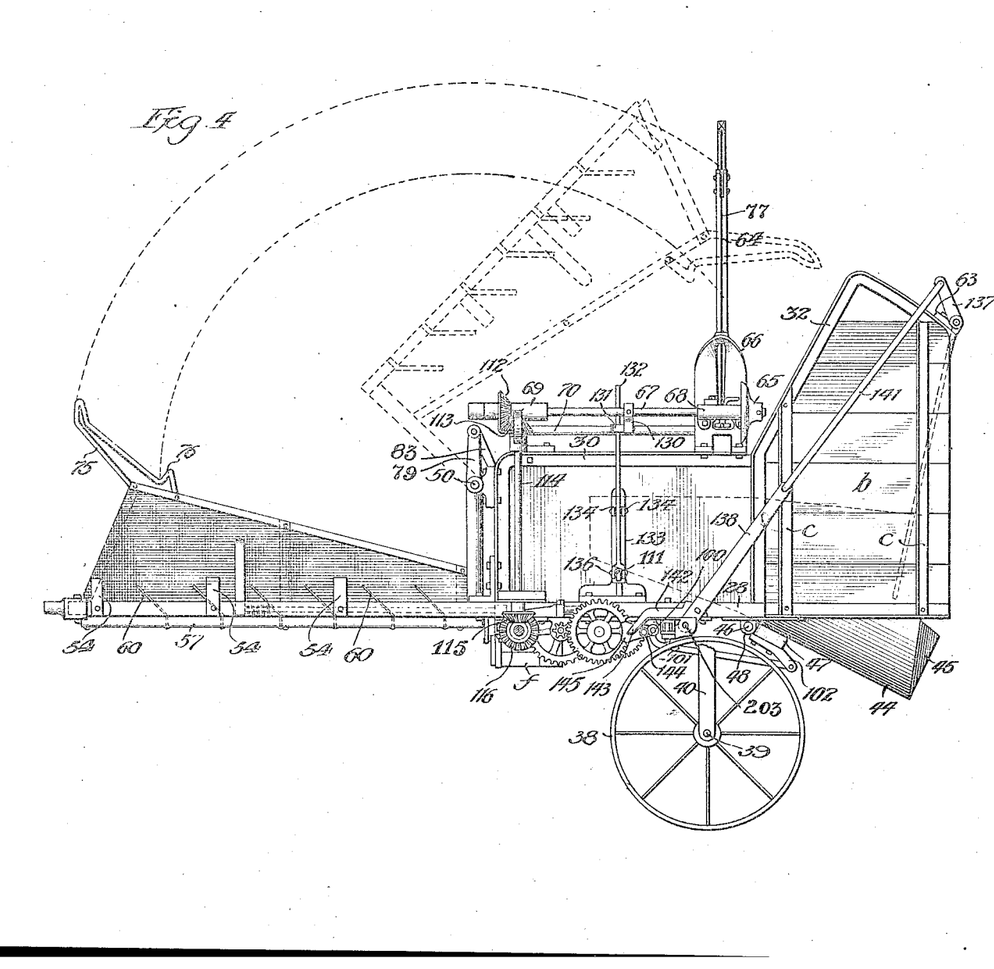
Fig. 4, a view in side elevation of the grain shocker, without the harvester, and showing the side adjacent to or which is connected with the harvester.

A bundle lifting cradle, basket or arm 49 is mounted forward of the dumping bottom above described, in position to deceive the bound bundles butt ends forward as they are discharged from the harvester binder, and to move with and carry the bundles successively upward and rearward in a circular path in a vertical plane parallel with the line or direction of travel of the machine, in such a manner as to reverse and deliver them butt ends rearward in the shock receptacle or the dumping bottom. The bundles are thus caused to pass in a circular path in a vertical plane through the arc of a circle of approximately 180 degrees, into the shock receptacle where the bundles are bound into a shock and dumped. This bundle lifting cradle or arm is mounted at its rear end upon a transverse rock shaft or fulcrum 50 which is supported in suitable bearings 51 as shown in Figs. 1, 3, and 4. The said cradle or arm is formed of a frame work which may consist of cross pieces 52 having upwardly extending end portions 53 and 54 adapted to form the side portions of the cradle or basket and to hold the bound bundles in position laterally. The outer side of the cradle is deeper or higher than the side adjacent to the harvester, and the latter extends toward the harvester with the top edge preferably below the level of the edge or ends of the rigid bundle supporting platform or fingers 78 over which the bundles are discharged onto the bundle lifting cradle by the bundle discharging arms of the harvester. The transverse frame members of the cradle or basket are connected with the longitudinal frame members 55 and 56, as shown in Figs. 2 and 3, and the body portion of the cradle which may be of canvas or other preferably light material is secured to the frame thus formed. This cradle or basket is secured to the transverse shaft or fulcrum 50 by means of a longitudinally extending arm 57 which extends along the bottom of the basket below the level of the transverse shaft aforesaid, and is provided with an upwardly extending rear end portion 58 secured in fixed relation to and supported by the shaft 50, the upper end of said arm being connected with said shaft by means of a transversely forked bracket or casting 59. A series of upwardly and forwardly inclined teeth 60 are arranged preferably along the central portion of the cradle or basket 49 in position to engage each bundle as it is received in the cradle and hold it in position in or upon the cradle during the upward and rearward movement of the latter. These teeth prevent the bundles from falling endwise or from the cradle before reaching their proper position with respect to the shock receptacle, particularly in case the arm or cradle is stopped during its upward and rearward movement, as it frequently is in practice.

In order to provide means for limiting the rearward movement of the bundles during the formation and binding of the shock and to permit the dumping of the shock, and also provide means for preventing the bundles from being jarred out of proper position or dislodged during the formation of the shock an upwardly and rearwardly swinging tail piece 61 is mounted adjacent to the rear end of the dumping bottom. This tail piece is substantially upright when in position to close the rear of the shock receptacle, and is adapted to be swung upward and rearward to the position indicated in dotted lines in Fig. 1, prior to or simultaneously with the dumping of the shock, and to be held in raised position until the dumping of the shock is completed and the tail piece has been carried forward over the latter. The tail piece 61 is secured to and supported by a transverse rock shaft 62 which is journaled or rockingly mounted in bearing brackets 63, said brackets being supported by the frame of the shock receptacle.

In order to provide suitable means for placing the binding twine around and binding the shock, and for placing the twine in position to extend under the shock in the shock receptacle from the time of the depositing of the first bundle of the shock to the completion of each shock respectively, a shock binder arm or needle 64 is mounted on one side of the shock receptacle, and knotter mechanism comprising a knotter cam 65 on a knotter cam shaft 67, and having the usual breast plate 66, is mounted on the opposite side of the shock receptacle directly opposite the binder arm or needle of the shocker. The knotter mechanism may be of any ordinary, well known, or desired type, and it is not deemed necessary or desirable to further describe the same in detail herein. The knotter cam shaft 67 above mentioned, is provided with suitable bearings 68 and 69 upon the frame of the shocker, the latter bearing being in the form of a bracket or casting adapted to hold the gears for operating the shaft in operative engagement. The binder arm or needle 64 is mounted upon and in fixed relation to a supporting and operating shaft 70 which is journaled in bearings or brackets 71 upon the side frame of the shocker or shock receptacle. The knotter cam shaft or knotter operating shaft 67 and the needle arm operating shaft 70 are operatively connected by means of a crank arm 72 on and in fixed relation to the knotter cam shaft, a crank arm 73 on the binder arm shaft, and a pitman or connecting rod 74, the opposite ends of which are secured to said crank arms respectively.

The binder arm or needle and the knotter mechanism, are, as already suggested, located on opposite sides of the shocker and shock receptacle, and are adapted to permit the shock to be accumulated or built up between them, being in such position that when the needle is threaded with twine which extends across the shock receptacle from the knotter mechanism, said twine will extend across the path of the first bundle of each shock to be placed in the shock receptacle, as well as from side to side of the shock receptacle, and will extend beneath the first bundle and all of the bundles of each shock in such position that when the binder arm or needle of the shocker is operated the twine will encircle the shock in the desired position to bind the same effectively.

In order to provide means for guiding the twine for binding the shock, downward and to the proper position in advance of the first bundle of each shock to be deposited in the shock receptacle a projection or guiding finger 75 on the upwardly extending outer side of the bundle lifting cradle or basket 49 is arranged or secured in position to extend above the level of the top of the bundle in the cradle when the latter is in initial or normal position and to engage the twine in advance of the first bundle of grain of each shock to be deposited in the shock receptacle.

The outer wall portion of the bundle lifting cradle, as well as the twine guiding projection or finger should be of sufficient height to extend above the level of the top of the bundle contained in said cradle, so as to prevent the straws from projecting so as to engage the twine in advance of the twine-guiding finger when the first bundle is deposited in the shock receptacle. This twine engaging finger 75 is adapted to be moved rearward by the same mechanism which operates the bundle lifting cradle, and to engage the twine at a point between the binder arm and the knotter mechanism, so as to slack the twine in advance of the bundle and also guide the twine to the proper position longitudinally of the bundle or shock. The stop 76 which forms a stop for holding the twine in the proper position longitudinally of the bundle is at the bottom or inner end of the upwardly and rearwardly inclined finger, and may be integral with the latter. The finger is adapted to engage the twine in advance of the bundle contained in the cradle until the twine reaches the position indicated in broken lines in Fig. 3, and the cradle reaches a corresponding position between the binder arm and the knotter mechanism, or in other words, until the cradle reaches the limit of its rearward movement, and the twine is thus slacked or loosened sufficiently. The twine is carried downward from the position shown in broken lines in Fig. 3, or from the position to which it is moved by the guiding finger, by the first bundle of each shock, and the binder arm is automatically operated so as to bind the shock at the proper time, and the bundle lifting cradle, the dumping bottom or shock receptacle, and the tail piece for limiting the rearward movement of the bundles as they are deposited in the shock receptacle, are all operated, released or controlled automatically, by the mechanism herein elsewhere more particularly described, and are all operatively connected with and operated by means of the harvesting machine.

Having described the construction and arrangement of the bundle lifting cradle or arm, the shock binding mechanism, or needle and knotter, the twine slacking or guiding finger, and the dumping bottom or shock receptacle, and the tail piece, the means for releasing, actuating or controlling the operation of these elements or mechanisms will now be described.

The bundle lifting cradle or arm 49 is located adjacent to and below the level of the outer edge of the binder deck 14 of the harvesting machine, and the bundle supporting fingers or platform 78 are arranged in position to bridge the otherwise open space between the edge of the binder deck or table and the inner edge of the cradle and support the bundle as it is discharged onto the cradle. In order to provide means for operating the bundle lifting cradle, and for operatively connecting it with the harvester mechanism or source of power, the shaft 50, already described is provided at one end with a crank arm 79. A cradle-operating shaft 80 is mounted in suitable bearings 81 and provided with a crank arm 82 which is operatively connected by means of a connecting rod 83 with said crank arm 79 and thereby with the shaft 50 and the bundle lifting cradle. A crank arm $e$ is also provided on the end of the shaft 50 in position to engage and limit the movement of the connecting rod 83 and thereby prevent backward and forward movement of said connecting rod and undesirable vibration or play of the cradle. See Figs. 1, 2, and 3. Each rotation of the shaft 80 with its crank arm 82 will operate the bundle lifting cradle or arm and carry one bound bundle from the harvester binder upward and rearward in a circular path in a vertical plane parallel with the direction of movement of the harvesting machine, into the shock receptacle.

In order to provide means for operatively connecting the intermittently revolving shaft 80, and thereby the cradle 49, with the constantly revolving shaft 20 which is operated by the harvesting machine, so that said shaft 20 will operate the cradle as well as the other parts of the shocker mechanism in their proper order, and in the proper relation to each other and to the harvester mechanism, a spur gear wheel 84 is mounted in fixed relation to the shaft 20, and a spur gear 85 is loosely mounted on the shaft 80 in toothed engagement with the gear 84, and in fixed relation to the ratchet wheel 86. This ratchet wheel is preferably integral with said last mentioned gear wheel. A disk or dog supporting member 87 is fixed to the shaft 80, and a dog 88 is pivotally mounted on said disk and provided with a roller 89 adapted to be pressed into engagement with the teeth of the ratchet 86 by the action of a compressible spring 90, which is supported by said disk. By releasing the dog and permitting it to engage the ratchet the shaft 80 is caused to revolve one rotation. In order to provide means for automatically releasing the dog 88 once for each bundle deposited in the cradle, and simultaneously with the depositing of each bundle into said cradle, tripping mechanism is provided which is adapted to be operated automatically by each bundle discharged onto the cradle, and to release the dog 88 so as to cause the shaft 80 to rotate once for each bundle as already suggested. This tripping mechanism consists of a rock shaft 91 mounted in suitable bearings 192 and 193, (see Figs. 2, 3, 4 and 6) and said rock shaft is provided with one or more tripping fingers 194 which project upwardly between the bundle-supporting fingers 78 into the path of the bundles as they pass from the harvester binder into the bundle lifting cradle. The opposite end of the rock shaft 91 is operatively connected with the dog 88 by means of a crank 95 on the shaft 91, a rock shaft 92 mounted in bearings $f$ and having a finger or trip-dog stop 93 thereon movable into and out of engagement with the dog 88; and a crank arm 94 on said shaft 92, and a connecting rod or pitman 96 which connects the cranks 94 and 95. See Figs. 3 and 5. In order to provide means for returning the rock shaft 91 and the tripping fingers or triggers 94 to initial position after the passage of each bundle, a tension spring $g$ is mounted upon said shaft and so connected therewith as to yieldingly hold the tripping finger or fingers in normal or initial position, and permit the same to be operated by the bundles as they pass to the cradle. A ratchet 97 is mounted on the shaft 80, and an ordinary pawl 98 is pivotally mounted on a fixed support and in operative engagement with said ratchet for preventing reverse movement of the shaft 80, and the parts operated by the latter.

Figures 6, 7, 8:
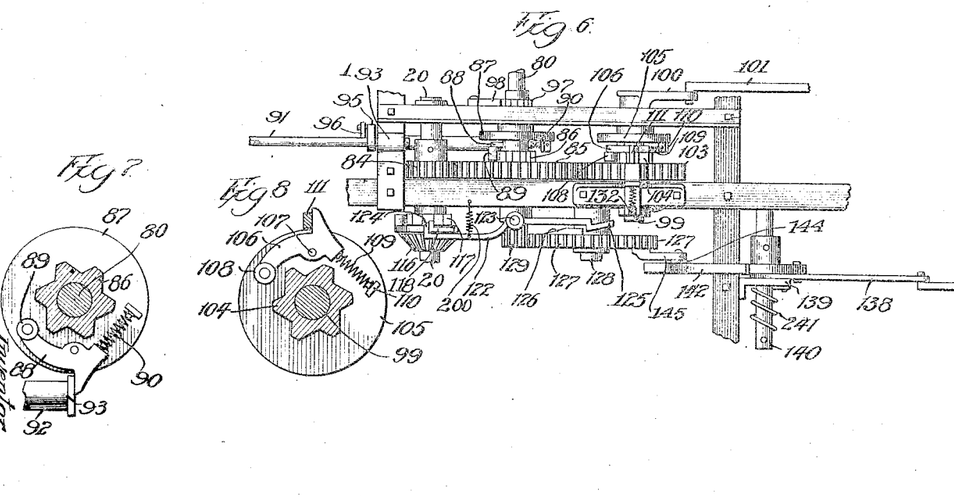

In order to provide means for operatively connecting the dumping bottom or shock receptacle intermittently with the constantly rotating shaft 20 and source of power, through the medium of the shaft 80 and the gears 84 and 85 already described, and shown in detail in Fig. 6, a stub shaft 99 is mounted in suitable bearings in the shocker frame and adjacent to and parallel with the shaft 80. This shaft 99 is operatively connected with the dumping bottom by means of a crank 100 on said shaft, a connecting rod 101 having one end secured to the crank 100, and a crank or lever arm 102 secured to the dumping bottom by means of the cross piece or sill 47 and pivotally connected to the rear end of said connecting rod 101. A spur gear wheel 103 is loosely mounted on and rotatable with respect to the stub shaft 99, and in toothed engagement with the spur wheel 85 already described. The spur wheels 84, 85 and 103 are thus adapted to be kept in constant rotation, and are constantly operatively connected with the constantly rotating shaft 20.

The means for operatively connecting the shaft 99 and thereby the dumping bottom, intermittently with the constantly rotating gear 103, and indirectly with the constantly rotating shaft 20, consists of dog, ratchet and disk mechanism shown in Figs. 6 and 8, and similar to the mechanism already described in connection with the shaft 80. More specifically described, said means consists of a ratchet wheel 104 which is mounted in fixed relation to or integral with the spur gear 103, and rotatably with respect to the shaft 99. A disk 105 is mounted on and in fixed relation to the stub shaft 99, and a dog 106 is pivotally secured to the disk 105 by means of a pivot 107, as shown in Fig. 8, and provided with a roller 108 which is adapted to be automatically held in engagement with the teeth of the ratchet 104 by means of a compressible spring 109, said spring being mounted on said disk between a lug 110 and the end of the dog. Said dog is held out of engagement with the ratchet by means of a trip stop 111 and when out of engagement with said ratchet the shaft 99 will remain stationary, and when the dog is released by the trip stop and allowed to engage said ratchet, the shaft 99 will be caused to revolve. The last mentioned dog is adapted to be pressed by the spring 109 into engagement with the ratchet and thus to operatively connect the ratchet 104 and the gear wheel 103 with the shaft 99, when said dog is released. It is desirable to make this last mentioned connection and to operate the dumping bottom only once for each shock, and the operation of the dumping bottom should follow the operation of the shock binding mechanism, and should precede the operation of the bundle lifting cradle for the first bundle of the next successive shock to be formed. Therefore the means for tripping and releasing the dog 106 and thereby operatively connecting the intermittently rotating shaft 99 with the constantly rotating shaft 20 is through the medium of the spur wheels 84 and 85, and 103 as already described. And the means for tripping or releasing the dog 106, to actuate the dumping bottom, is adapted to be operated by the knotter cam shaft 67 of the shock binder mechanism.

The knotter cam shaft is to be automatically operated once for each shock and immediately following the placing of the last bundle of each shock in the shock receptacle, and just before the operaton of the dumping bottom. In order to enable these objects to be accomplished in a simple and efficient manner, the knotter cam shaft 67 is connected with and adapted to operate the binder arm or needle as already described and, as shown in Figs. 2, 4 and 6, is provided with a bevel gear wheel 112 which is in toothed engagement with a bevel gear wheel 113 on an upright shaft 114, which shaft is operatively connected with the constantly rotating shaft 20 by means of a bevel gear 115 on said shaft 114, and a bevel gear 116 loosely mounted on the shaft 20 and in toothed engagement with the gear 115, and adapted to be intermittently connected with the constantly rotating shaft 20.

Figure 5:
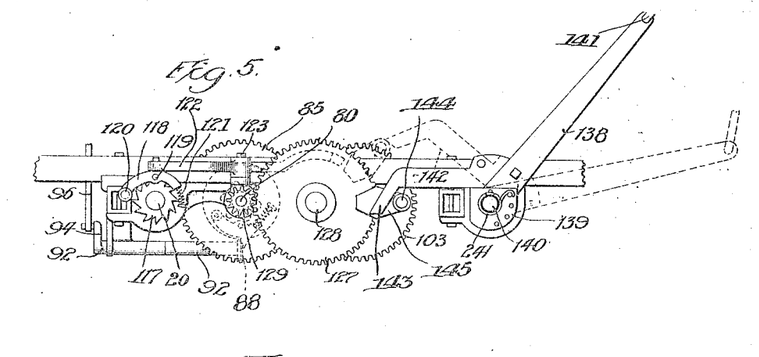
Fig. 5, an enlarged view in detail in side elevation of the mechanism for operatively connecting and controlling, or releasing the bundle lifting cradle, the shock binding mechanism, the dumping bottom, and the tail piece or end gate of the shock receptacle, and for operatively connecting the shocker mechanism with the harvester.

The means for intermittently connecting the bevel gear 116 with the shaft 20, and thereby intermittently connecting the shock binding mechanism or knotter shaft 67 with said shaft 20 is similar to the dog and ratchet mechanism already described in connection with the shafts 80 and 99 respectively, and is shown in Figs. 5 and 6. A ratchet wheel 117 is mounted upon and in fixed relation to the constantly rotating shaft 20 and adjacent to the loosely mounted bevel gear wheel 116, and a dog 118 is pivotally mounted upon said bevel gear wheel 116 by means of a pivot 119, and is provided with a roller 120 adapted to be pressed into engagement with the teeth of said ratchet 117 by means of a compressible spring 121, when the dog is released, and thereby to operatively connect the bevel gear wheel 116 of the shock binding mechanism with the shaft 20, or source of power. The dog 118 is held out of engagement with the ratchet 117, and automatically released or tripped by means of a laterally operated bundle trip stop 122, (see Fig. 6) which trip stop is mounted upon a vertical pivot 123 and provided at one end with a dog-engaging hook, lug, or extension 124. The trip stop is provided at its opposite end with a cam surface or end portion 125 adjacent to and adapted to be engaged by the cam 126 of a spur gear wheel 127. The gear wheel 127 is supported upon and rotatable with respect to a stub shaft 128, and is in toothed engagement with a spur pinion 129 which is mounted on and in fixed relation to the shaft 80 already described. With the above elements arranged as described, the spur pinion 129 revolves with the intermittently revolving shaft 80 on which it is mounted, once for each bundle deposited in the shock receptacle, or once for each operation of the cradle, and the spur wheel engaged by said pinion revolves once for each shock, the relative sizes of said pinion and spur wheel being in proportion to the number of bundles required to form a shock, which may be any desired number.

In order to permit the shock binding mechanism to have a sufficient interval of time in which to operate efficiently, it is desirable to permit the shaft 20 and the spur wheel 116 thereon to revolve twice for each operation of the shock binding mechanism, or twice for each revolution or operation of the knotter cam shaft. In order to enable this to be accomplished the cam 126 on the gear wheel 127 is so constructed that it forms a delay surface of sufficient length to hold the trip stop 122 out of the path of travel of the dog 118 in its first revolution and permit said trip stop to engage and stop said dog in its final or second revolution for each operation of the binder mechanism. By the above arrangement the spur wheel 127 is rotated by the pinion 129 once for each shock and is adapted to operate the trip lever 122 and thereby release and permit the operation of the shock-binding mechanism or knotter cam shaft at the proper time and once for each shock.

In order to enable the mechanism for operating the dumping bottom to be released, tripped, or actuated through the medium of the knotter cam shaft, said shaft is provided with a cam arm 130 shown in Figs. 1, 2 and 4, which is provided with a roller 131 adapted to engage an upwardly extending tripping lever 132 when the tying operation is completed. The trip lever 132 is pivotally supported on the main frame of the shocker by means of an upright bracket 133 having lugs 134 between which said lever extends and to which it is pivoted. The bottom end of the tripping lever 132 is operatively connected with a longitudinally movable trip stop bar or bolt 111 by means of a pivot 136, as shown in Fig. 4. The bolt or stop arm 111 is slidably supported by the bracket 133, or other suitable support, in position to be moved into and out of engagement with the dog 106, so as to throw the dog out of engagement with the constantly rotating ratchet 104 when the dumping bottom and the mechanism for operating it is to be at rest, and so as to release said dog and thereby permit it to engage the ratchet and operatively connect the dumping bottom with the constantly rotating shaft 20 in the manner already described. The binding mechanism is thrown into operation just before the bundle lifting cradle starts to recede after throwing the last bundle into the shock receptacle. The binding mechanism is thrown out of operation when the lug or cam 126 passes out of engagement with the cam surface or end portion 125 of the bundle trip stop 122. Then the spring 200 returns the stop 122 to normal position or into the path of the rotating dog 118. The dog 118 makes two revolutions, and the stop does not get into its path until the last of the two revolutions of said dog for each operation of the binder mechanism. When the stop is thrown into the path of the dog 118 in the last of said two revolutions, it disconnects the binder until the arm that carries the bundles into the shock receptacle has gone back to its initial position ready to receive another bundle. The shaft 80 then ceases to rotate again until the next bundle again releases the trip dog 88 shown in Fig. 6. The binder, however, remains disconnected until the gear 127 has performed a complete revolution and brings cam 126 again into engagement with trip stop 122.

In order to provide means for operating the tail piece or end gate 61 and holding it in raised position until the shock is dumped and the tail piece is allowed to pass over the shock, the shaft 62, already described, which supports the tail piece is provided with a crank arm 137, and a lever 138, (see Figs. 4 and 6) is mounted in a bracket 139 upon a stub shaft or pivot 140 which is journaled in said bracket, and said lever is operatively connected with the crank 137 by means of a pitman or connecting rod 141 which is connected at its opposite ends with said lever and crank, and adapted to form a toggle or rigid connection between said parts when in normal position, so as to lock the tail piece or end gate in closed position until it is released or raised by the mechanism for operating it. A spring 241 upon the shaft 140 and in operative engagement with the lever 138 serves to hold the lever and thereby the connecting rod and the tail piece in initial or normal position. The lever 138 is provided with a lever arm 142 having a forwardly and downwardly extending end portion 143 which forms a cam or delay surface adapted to be engaged by a roller 144 which is rotatably mounted on the end of a crank 145 on the spur gear 127. By this arrangement it will be readily seen that the rotation of said spur gear will raise the lever arm 142 and thereby the tail piece and hold said lever arm and the tail piece in raised position until the roller 144 passes out of engagement with said lever arm, the interval of time during which the tail piece is held in raised position being sufficient to permit the dumping of the shock and to permit the tail piece to pass over the shock. The arm 145 engages arm 142 just previous to the completed delivery of the last bundle into the shock receptacle and just before the beginning of the binding operation. The rear gate or tail piece is restored to its normal position when the roller 144 on the arm 145, during the revolution of the wheel 127, passes out of engagement with the arm 143, thereby allowing the tail piece or gate to drop of its own weight and also with the assistance of the coil spring 241 on the shaft 140 which shaft is secured in rigid relation to the arm 143.

I claim:

1. In a shocking machine, a dumping sheaf receiving cradle, a pivotally supported sheaf delivering member located forward thereof and having a sheaf engaging portion adapted to swing upward and rearwardly toward said cradle to deposit sheaves therein, binding mechanism for binding sheaves contained in said cradle and mechanism operatively connected with the sheaf delivering member and with said binding mechanism respectively for operating the same in a predetermined order.

2. In a shocking machine, a frame, a rearwardly dumping sheaf receiving cradle supported thereby, a pivoted sheaf delivering member located forward of said cradle and adapted to swing upward and rearwardly toward said cradle in depositing the sheaves therein, binding mechanism for binding sheaves contained in said cradle, mechanism for operating the binder mechanism and the sheaf delivering mechanism respectively, means for connecting the binder mechanism and the sheaf delivering mechanism, and means for dumping the sheaf receiving cradle.

3. In a shocking machine, a rearwardly dumping sheaf receiving member, an upwardly and downwardly swinging binder arm located on one side of said cradle and provided with a needle, knotter mechanism located on the opposite side of said cradle from said binder arm, and a pivoted upwardly and rearwardly movable sheaf delivering member located forward of said cradle and adapted to deposit bundles of grain in said cradle.

4. In a shocking machine, a shocker frame, a binder arm mounted on one side of the center thereof, knotter mechanism mounted on the opposite side of said frame from said binder arm, a rearwardly dumping sheaf receiving member located between said binder arm and said knotter mechanism, and a sheaf delivering member mounted forward of the rearwardly dumping cradle and adapted to swing rearwardly between said binder arm and said knotter mechanism.

5. In a shocking machine, a shocker frame, a sheaf receiving cradle carried thereon, a binder arm located on one side of said cradle, knotter mechanism located on the opposite side thereof from said binder arm, a sheaf delivering member mounted forward of said binder arm and knotter mechanism and adapted to swing rearward between the same, and means for operating said sheaf delivering member.

6. In a shocking machine, a rearwardly dumping sheaf receiving cradle, a binder arm located on one side of the same, knotter mechanism located on the opposite side of the same from said binder arm, a sheaf delivering member mounted forward of said cradle and adapted to swing rearward between said binder arm and said knotter mechanism, and means for operating the sheaf delivering member, the binder mechanism and the rearwardly dumping cradle.

7. In a shocking machine, a sheaf receiving member, shock binding mechanism comprising a binder arm located on one side of said member, and knotter mechanism located on the opposite side thereof from said binder arm, a sheaf delivering member located forward of the sheaf receiving member, and pivotally secured in position to swing upward and rearward in a vertical plane toward said sheaf receiving member and between said binder arm and knotter mechanism, means for operatively connecting the shocker with a harvesting machine.

8. In a shocking machine, a rearwardly dumping sheaf receiving member, shock binder mechanism having a binder arm and knotter mechanism adapted to hold binder twine in position to extend transversely with respect to the sheaf receiving member, and a sheaf delivering member pivotally mounted forward of the sheaf receiving cradle and shock binder mechanism and adapted to swing upward and rearward in a vertical plane.

9. In a shocking machine, a sheaf receiving member, a shock binding mechanism comprising a binder arm located on one side thereof, and knotter mechanism located on the opposite side thereof from said binder arm, a sheaf delivering member pivotally mounted forward of said cradle and adapted to swing upward and rearward in a vertical plane with a sheaf, and a series of teeth on said sheaf delivering member adapted to engage a sheaf supported by the latter.

10. In a shocking machine, a shocker frame, a binder arm located on one side thereof, knotter mechanism located on the opposite side thereof, a rearwardly dumping cradle located intermediate said arm and knotter mechanism, means for operatively connecting said arm and mechanism, a sheaf delivery arm located forward of said cradle adapted to swing rearward between said binder arm and knotter mechanism to deposit sheaves butt end rearward between said binder arm and knotter mechanism, and means for operating said delivering arm, binder mechanism, and cradle, respectively.

11. In a machine of the class described, the combination of a portable shock receptacle, a transverse pivot in supporting engagement with said shock receptacle, a pivoted reciprocating bundle lifting member located forward of the shock receptacle and having a bundle engaging portion adapted to swing upward and rearward toward the shock receptacle, to deposit bundles in the latter, binding mechanism for binding bundles contained in the shock receptacle, means for actuating the bundle lifting member, and means actuated by the last mentioned means for actuating the binding mechanism.

12. In a machine of the class described, the combination of a frame, a rearwardly dumping shock receptacle supported by the frame, a transverse pivot in supporting engagement with said shock receptacle, a pivoted reciprocating bundle lifting member located forward of the shock receptacle and adapted to swing upward and rearward toward the rearwardly dumping shock receptacle, for depositing bundles in the latter, binding mechanism for binding bundles contained in the shock receptacle, means for actuating the bundle lifting members, means actuated by the last mentioned means for actuating the binding mechanism, and means for dumping the shock receptacle.

13. In a machine of the class described, the combination of a rearwardly dumping shock receptacle, a transverse pivot in supporting engagement with said shock receptacle, a pivoted reciprocating bundle lifting member located forward of the shock receptacle and adapted to swing upward and rearward toward the shock receptacle, binding mechanism for binding the shock, means for operatively connecting the shock binding mechanism with the bundle lifting member, and means for operating the bundle lifting member and the shock receptacle.

14. In a machine of the class described, the combination of a rearwardly dumping shock receptacle, a pivoted reciprocating bundle lifting cradle located forward of the shock receptacle and adapted to swing upward and rearward toward the shock receptacle, means for automatically actuating the bundle lifting cradle, binding mechanism for binding bundles contained in the rearwardly dumping shock receptacle and means for operatively connecting said binding mechanism with the bundle lifting cradle actuating mechanism.

15. In a machine of the class described, the combination of a shock receptacle, a pivoted reciprocating bundle-lifting member having a bundle engaging portion movable upward and rearward toward the shock receptacle and adapted to deposit bundles butt end rearward in the shock receptacle, shock binding mechanism adapted to bind bundles contained in the shock receptacle, means for actuating the bundle lifting member, and means actuated by the last mentioned means for actuating the binding mechanism, adapted to actuate the same in predetermined order.

16. In a machine of the class described, the combination of a self-binding grain harvesting machine provided with a traction wheel and binder mechanism, a shock forming receptacle located on the stubbleward side of the path of travel of the traction wheel, means for receiving a discharged bundle from the harvester binder at the stubbleward side of the main traction wheel of the harvester, means for operating said receiving means to raise the bundle and deliver it into the shock forming receptacle butt end rearward, shock binding mechanism associated with the shock-forming receptacle for binding bundles contained in said receptacle, means for operatively connecting the shock binding mechanism with the mechanism for operating said bundle receiving means, and means operatively connected with said shock-forming receptacle and operatively connected with and adapted to be driven by a moving part of the harvester for operating said receptacle to carry the shock to upright position.

17. In a grain shocker, the combination of a rearwardly dumping shock receptacle, an upwardly and downwardly movable binder arm located on one side of the shock receptacle and provided with a needle, knotter mechanism located on the opposite side of the shock receptacle from said binder arm, a transverse pivot in supporting engagement with the shock receptacle, and a pivoted reciprocating bundle lifting cradle located forward of the shock receptacle and adapted to deposit bundles of grain in said rearwardly dumping shock receptacle.

18. In a grain shocker, the combination of a shocker frame, a binder arm mounted on one side of the center of the shocker frame, knotter mechanism mounted on the opposite side of the shocker frame from said binder arm, a rearwardly dumping shock receptacle located between said binder arm and said knotter mechanism, a transverse pivot in supporting engagement with the shock receptacle, and a pivoted reciproating bundle lifting cradle mounted forward of the rearwardly dumping shock receptacle and adapted to swing rearward between said binder arm and said knotter mechanism.

19. In a grain shocker, the combination of a shocker frame provided with a shock receptacle, a transverse pivot in supporting engagement with the shock receptacle, a binder arm located on one side of the shock receptacle, knotter mechanism located on the opposite side of the shock receptacle from said binder arm, a pivoted reciprocating bundle lifting cradle mounted forward of the binder arm and knotter mechanism and adapted to swing rearward between the binder arm and the side of the shock receptacle on which the knotter mechanism is located, and means for operating the bundle lifting cradle.

20. In a grain shocker, the combination of a rearwardly dumping shock receptacle, a transverse pivot in supporting engagement with the shock receptacle, a binder arm located on one side of the shock receptacle, knotter mechanism located on the opposite side of the shock receptacle from said binder arm, a pivoted reciprocating bundle lifting arm mounted forward of the shock receptacle and adapted to swing rearward between said binder arm and said knotter mechanism, and means for operating the bundle lifting cradle, the binder mechanism and the rearwardly dumping shock receptacle.

21. In a grain shocker, the combination of a shock receptacle shock binder mechanism comprising a binder arm located on one side of the shock receptacle and knotter mechanism located on the opposite side of the shock receptacle from said binder arm, a reciprocating bundle lifting cradle located forward of the shock receptacle and pivotally secured in position to swing upward and rearward in a vertical plane toward the shock receptacle and between said binder arm and knotter mechanism, and means for operatively connecting the shocker with a grain harvesting machine.

22. In a grain shocker, the combination of a shock receptacle, shock binder mechanism comprising a binder arm located on one side of the shock receptacle, and knotter mechanism located on the opposite side of the shock receptacle from said binder arm, a reciprocating bundle lifting cradle pivotally mounted forward of the shock receptacle and shock binder mechanism and adapted to swing upward and rearward in a vertical plane in supporting engagement with a bundle to be carried thereby, and means for preventing the bundle from falling downward longitudinally of the cradle when the latter is in raised position.

23. In a grain shocker, the combination of a shock receptacle shock binder mechanism comprising a binder arm located on one side of the shock receptacle and knotter mechanism located on the opposite side of the shock receptacle from said binder arm, a reciprocating bundle lifting cradle pivotally mounted forward of the shock receptacle and adapted to swing upward and rearward in a vertical plane in supporting engagement with a bundle to be carried thereby, and a series of teeth on said cradle, adapted to engage a bundle supported by the latter.

24. In a grain shocker, the combination of a shock receptacle with a binder arm, a rock shaft upon which said binder arm is mounted, knotter mechanism comprising a knotter cam shaft, mechanism operatively connecting the rock shaft upon which the binder arm is mounted with the cam shaft, and a reciprocating bundle lifting arm pivotally mounted and adapted to swing upward and rearward over the mechanism which connects said binder arm rock shaft and knotter cam shaft.

25. In a grain shocker, the combination of a rearwardly dumping shock receptacle, shock binder mechanism having a binder arm and knotter mechanism adapted to hold binder twine in position to extend transversely with respect to the shock receptacle, and a reciprocating bundle lifting cradle or arm pivotally mounted forward of the shock receptacle and shock binder mechanism and adapted to swing upward and rearward in a vertical plane.

26. In a grain shocker, the combination of a shock receptacle, shock binding mechanism comprising a binder arm and knotter mechanism adapted to hold twine in position to extend transversely with respect to the shock receptacle, a bundle lifting cradle or arm pivotally mounted forward of the shock receptacle and adapted to swing rearward in a vertical plane with a bundle to be carried thereby, and a twine engaging member adapted to pass between the binder arm and knotter mechanism and into engagement with the twine in advance of the bundle to be carried by said cradle.

27. In a grain shocker, the combination of a shock receptacle, shock binding mechanism comprising a binder arm located on one side of the shock receptacle, and knotter mechanism located on the opposite side of the shock receptacle from said binder arm, said binder arm and knotter mechanism being adapted to hold twine in position to extend transversely across the shock receptacle, a bundle lifting cradle or arm pivotally mounted forward of the shock receptacle and adapted to swing rearward in a vertical plane with a bundle to be carried thereby, said bundle lifting cradle having a projecting portion adapted to engage the twine in advance of the bundle.

28. In a grain shocker, the combination of a shock receptacle, shock binding mechanism comprising a binder arm located adjacent to one side of the shock receptacle, and knotter mechanism located adjacent to the opposite side of the shock receptacle from said binder arm, said binder arm and knotter mechanism being adapted to hold twine in position to extend across the shock receptacle, a bundle lifting cradle or arm located forward of the shock receptacle, a transverse shaft on which said cradle is mounted, mechanism for operating the cradle, and a finger operatively connected with and adapted to be moved by the cradle operating mechanism into engagement with the twine in advance of the bundle to be carried by the cradle, for slacking the twine.

29. In a grain shocker, the combination of a shocker frame provided with a rearwardly dumping shock receptacle, a flange secured to and extending upward and transversely of the lower rear end portion of the shock receptacle and fixedly secured to said receptacle, and a forwardly projecting lip on said flange and extending transversely of the shock receptacle.

30. In a machine of the class described, the combination of a grain harvesting machine, a shocker frame provided with a rearwardly dumping shock receptacle, means for securing the shocker frame to the frame of the grain harvesting machine, bundle discharging arms on the harvesting machine, a binder arm located on one side of the dumping shock receptacle, knotter mechanism located on the opposite side of the shock receptacle from said binder arm, a reciprocating bundle lifting arm or cradle located forward of the shock receptacle and adjacent to and adapted to receive bound bundles from the bundle discharging arms of the grain harvesting machine, and means for operatively connecting the shock binder mechanism, the bundle lifting arm and the rearwardly dumping shock receptacle with the grain harvesting machine.

EDWIN M. KELLOGG.

Witnesses:
HARRY IRWIN CROMER,
CARRIE E. JORDAN.